Oct. 31, 1967

C. G. HINGLEY 3,350,147

ROLLING BEARING ASSEMBLY

Filed Feb. 1, 1966

INVENTOR:
COLIN G. HINGLEY

BY Howson & Howson

ATTYS.

United States Patent Office 3,350,147
Patented Oct. 31, 1967

3,350,147
ROLLING BEARING ASSEMBLY
Colin G. Hingley, Strafford, Wayne, Pa., assignor to SKF Industries, Inc., King of Prussia, Pa., a corporation of Delaware
Filed Feb. 1, 1966, Ser. No. 524,289
2 Claims. (Cl. 308—187)

ABSTRACT OF THE DISCLOSURE

A rolling bearing assembly comprising a pair of spaced apart rings, at least one of which has a pair of circumferentially extending land surfaces on opposite sides of the raceway, a plurality of rolling elements in the annular space between the rings and a cage for guiding the rolling elements. The cage includes a pair of annular members each having at least one circumferentially extending surface closely adjacent and confronting the circumferentially extending land surfaces of one of the rings. Further, the circumferential surface of each annular member is provided with a plurality of spaced V-shaped lubricant channels whereby upon rotation of said one ring in a direction opposite the direction in which said V-grooves point, lubricant pressure of a lubricant in the channels builds up toward the apex of the V-shaped grooves and forms a hydrodynamic film between the land surfaces and the annular members.

---

This invention relates to improvements in rolling bearing assemblies and more particularly to an improvement in rolling bearing assemblies incorporating a cage for guiding the rolling elements.

Some rolling bearing assemblies comprise inner and outer rings which are spaced apart to define an annular space for the rolling elements and a cage for separating the rolling elements in the annular space. These cages usually comprise a pair of annular members and a plurality of cross pieces or webs which connect the annular members in spaced apart relation and which cross pieces are circumferentially spaced to define pockets for the rolling elements. In some of these bearing assemblies, one of the rings is provided with a pair of radial flanges on either side of the raceway having circumferentially extending land surfaces on which the annular members of the cage ride. These cages are generally designated "land riding cages." Land riding cages are generally used when required by operating conditions as in high speed applications. Even though these cages do not carry the bearing load, they can be subjected to considerable inertia forces due to rolling element acceleration, shocks due to the character of the service, and centrifugal forces due to high speed.

Several disadvantages or drawbacks have been noted in these land riding cage-type bearing assemblies especially in high speed applications. For example, even with normal lubrication of the bearing assembly, it has been found that the interengagement of the annular members of the cage on the land during operation of the bearing can produce wear and that the wear particles tend to accumulate in the bearing assembly and cause undue and excessive wear on parts thereof such as the rolling elements which contributes to premature failure of the bearing prior to its normal life expectancy. Furthermore, the interengagement of the annular members and guiding flange or land of the ring is a source of friction in the bearing. Lastly, the friction and wear problems noted above over a period of extensive use reduce the effective guiding function of the cage and it has been found that after a period of use, the rolling elements may be prone to skid, which further reduces the life of the overall assembly.

The present invention is designed to provide a cage-type rolling bearing assembly which overcomes the disadvantages and drawbacks of prior assemblies as noted above. To this end in accordance with the present invention, at least one of the confronting surfaces of either the annular member of the cage or the guide land of one of the rings is provided with a plurality of circumferentially spaced lubricant channels which are so oriented that upon rotation of the member having the lubricant channels in a predetermined direction during operation of the bearing, lubricant pressure of a lubricant in the channels builds up and forms a continuous hydrodynamic film between the annular members and ring thereby to provide an optimum guide support for the cage. In other words, the load-carrying capacity of the lubricant film is increased by absorbing, so to speak, the small quantity of the power from the rotating component of the assembly, namely, the member having the lubricant channels so that the surfaces act as simple, opposing screw pumps increasing the area under the pressure profile and therefore the load capacity. By this lubricant channel arrangement, it has been found that the wear and friction characteristics of the bearing assembly are reduced considerably and hence, the overall life of the entire assembly is therefore increased. Furthermore, by minimizing wear and friction, a more accurate and better guide assembly is provided.

Thus, it is an object of the present invention to provide a cage-type rolling bearing assembly characterized by novel features of construction and arrangement whereby the wear and friction charactertistics of the bearing assembly are reduced considerably.

Another object of the present invention is to provide a cage-type rolling bearing assembly where at least one of the interengaging surfaces between the cage and one of the rings is provided with a plurality of lubricant channels of a predetermined configuration and design to provide a hydrodynamic film between the cage and ring for optimum support.

Another object of the present invention is to provide a new and improved cage-type rolling bearing assembly which is of comparatively simplified construction and which may be manufactured easily and economically.

These and other objects of the present invention and the various features and details of the construction and operation thereof are hereinafter more fully set forth with reference to the accompanying drawing, wherein.

Figure 1:
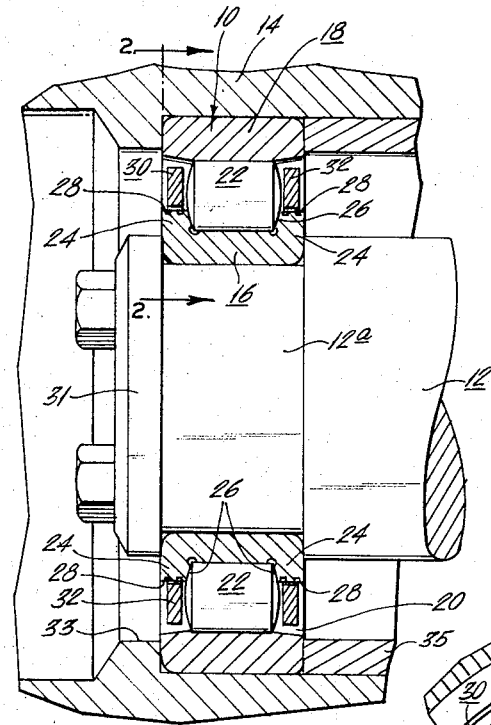
FIG. 1 is an enlarged sectional view showing a typical installation incorporating a cage-type rolling bearing assembly in accordance with the present invention.
Figure 4:
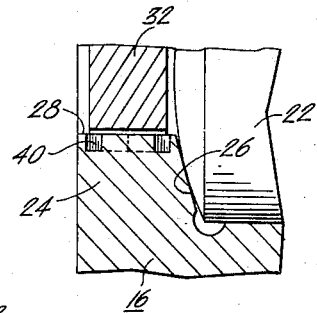
FIG. 4 is an enlarged fragmentary view showing a portion of one of the annular members of the cage and a section of the inner ring.
Figure 2:
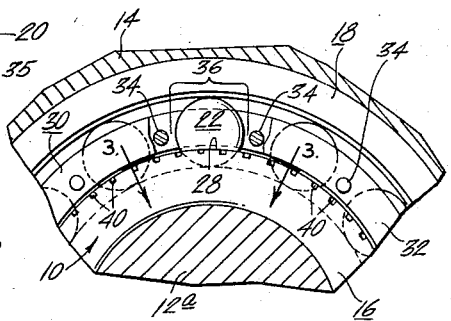
FIG. 2 is a fragmentary sectional view taken on lines 2—2 of FIG. 1.
Figure 5:
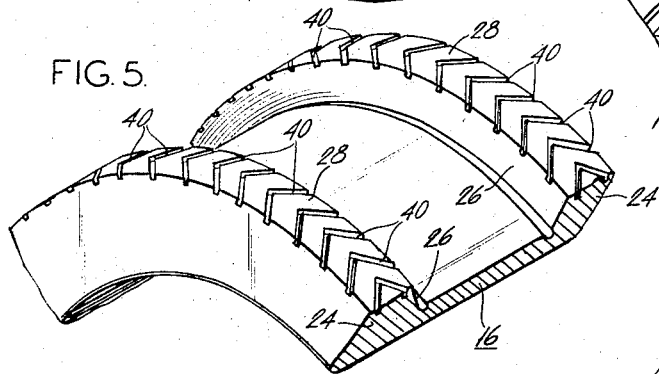
FIG. 5 is a fragmentary perspective view of the inner ring of the bearing assembly.
Figure 3:
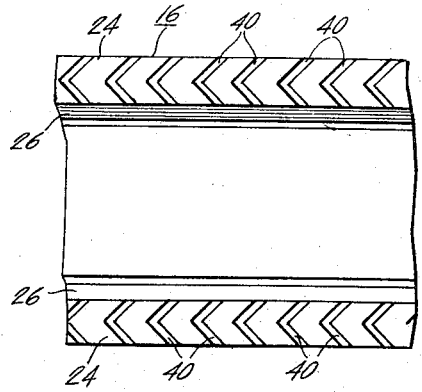
FIG. 3 is an enlarged fragmentary sectional view of a portion of the inner ring taken on line 3—3 of FIG. 2.

Referring now to the drawing, and particularly to FIG. 1 thereof, there is shown a rolling bearing assembly 10 in accordance with the present invention mounted in a typical installation including a rotatable shaft 12 mounted in an outer enclosure such as the housing 14. The rolling bearing assembly illustrated is a cylindrical roller bearing. However, it is to be understood that the principle of the present invention has useful application in other types of bearing assemblies.

The rolling bearing assembly comprises inner and outer rings 16 and 18 respectively which are spaced apart to define an annular space 20 therebetween for a plurality of rolling elements, which, in the bearing shown are rollers 22 having sphered end faces. In the present instance, the inner ring 16 has a pair of radially outwardly projecting circumferential flanges 24 at opposite axial ends thereof having tapered confronting shoulders 26 limiting axial movement of the rollers 22. Each flange 24 has a circumferentially extending axial land surface 28 on which the cage rides.

In the installation illustrated in FIG. 1 the bearing assembly 10 is supported in the usual manner.

Thus, the inner ring 16 is mounted on a reduced terminal end portion 12a of the shaft 12 and is held in place by means of a cap 31 secured to the axial end of the shaft 12 by suitable fastening means. The end faces of the outer ring 18 abut a radial shoulder 33 on the housing enclosure 14 and a sleeve or the like 35.

The cage 30 includes a pair of annular members 32 and a plurality of axial web members or cross pieces 34 which, in the present instance are connected to the annular members 32 and maintain them in spaced apart relation. The cross pieces are circumferentially spaced apart to define a plurality of pockets 36 for the rollers.

In accordance with the present invention, the rolling bearing assembly is characterized by novel features of construction and arrangement providing for optimum support for the cage in a manner minimizing wear, friction and other undesirable characteristics and providing for a more accurate guidance of the rolling elements and in general for an extended life of the bearing assembly. To this end, a plurality of circumferentially spaced lubricant channels is provided in at least one of the circumferentially extending confronting surfaces of the annular member of the cage and the land surface 28 on which it rides. In the illustrated embodiment of the invention, the lubricant channels 40 are provided in the land surfaces 28 of the inner ring. The lubricant channels 40 are oriented in a predetermined manner relative to the direction of rotation of the inner ring so that lubricant pressure of a lubricant in the channels builds up and forms a hydrodynamic film between the confronting surfaces of the annular members and land surfaces 28 providing an optimum riding support for the cage. In the present instance, the lubricant channels are chevron shaped or in the form of V-grooves in the land surface 28. These chevron-shaped lubricant channels may be formed in the land surface of the rings, for example, by means of an etching process. The V-grooves are oriented in a predetermined direction relative to the direction of rotation of the cage to effect pressure build up of a lubricant supplied to the bearing by conventional means and provide a continuous film across the face of the land surface having a flat pressure profile as illustrated by the profile A in FIG. 6. Thus, as compared with the lubricant pressure profile B of a conventional assembly having a planar land surface, the lubricant channel arrangement of the present invention provides a greater peak lubricant pressure and more uniform distribution across the land surface.

Figure 6:
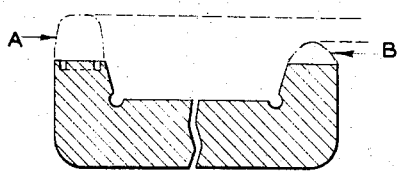
FIG. 6 is a schematic illustration of lubricant pressure profile.

More specifically as indicated in the drawing, the apex of each of the V-grooves points in the direction of relative rotation of the cage. By this configuration, there is provided a continuous film of lubricant between the land surface of the inner ring and the confronting surface of the annular members of the cage which has a pressure peak in the center of the rail and which, as in the illustration in FIG. 6, is much greater than the pressure peak of a conventional land surface and which is more uniform across the width of the land surface.

From the foregoing it is apparent that the present invention provides a novel improvement in rolling bearing assemblies employing cages for guiding the rolling elements and more particularly the land riding type of cage wherein the configuration of the confronting surfaces in the form of the lubricant channels provides a hydrodynamic film therebetween. In view of this, the tendency for the cage to wear is minimized thereby reducing considerably the problem of particle accumulation in the bearing assembly with affects the life thereof. Moreover, the guidance characteristics of the bearing assembly in accordance with the present invention is improved considerably and the friction forces in the assembly are reduced.

While a particular embodiment of the present invention has been illustrated and described above, it is not intended to limit the invention and changes and modifications may be made therein within the scope of the following claims.

I claim:

1. In a rolling bearing assembly comprising a pair of spaced apart rings having confronting raceways, at least one of said rings having a pair of circumferentially extending land surfaces on opposite sides of said raceway, a plurality of rolling elements in the annular space between the rings, a cage for guiding the rolling elements including a pair of annular members, each of said annular members having at least one circumferentially extending surface closely adjacent and confronting the circumferentially extending land surface of one of said rings, means defining a plurality of circumferentially spaced V-shaped lubricant channels in the circumferentially extending land surface of said one ring whereby upon rotation of said one ring in a direction opposite the direction in which said V-grooves point, lubricant pressure of a lubricant in the channels builds up toward the apex of said V-shaped grooves and forms a hydrodynamic film between the confronting land surfaces of said one ring and said surface of said annular members of the cage.

2. In a rolling bearing assembly comprising inner and outer radially spaced apart rings having confronting raceways, at least one of said rings having a pair of circumferentially extending land surfaces on opposite sides of said raceway, a plurality of rolling elements in the annular space between the rings, said inner ring having a radially inwardly extending guide flange at each axial end thereof having a circumferentially extending land surface, a cage for guiding the rolling elements including a pair of annular members and a plurality of cross pieces connecting the annular members in spaced apart relation, each of said annular members having at least one circumferentially extending surface closely adjacent and confronting a circumferentially extending surface of one of said rings, means defining a plurality of circumferentially spaced V-shaped lubricant channels in the circumferentially extending land surface of said inner ring whereby upon rotation of said inner ring in a direction opposite the direction in which said V-grooves point, lubricant pressure of a lubricant in the channels builds up toward the apex of said V-shaped grooves and forms a hydrodynamic film between confronting land surfaces of said inner ring and said surface of said annular members of the cage.

References Cited

UNITED STATES PATENTS

| | | | |
|---|---|---|---|
| 2,977,161 | 3/1961 | Cobb | 308—187 |
| 3,179,478 | 4/1965 | Readdy | 308—187 |

MARTIN P. SCHWADRON, *Primary Examiner.*

FRANK SUSKO, *Examiner.*